(12) United States Patent
Sutskever et al.

(10) Patent No.: US 11,080,594 B2
(45) Date of Patent: Aug. 3, 2021

(54) AUGMENTING NEURAL NETWORKS WITH EXTERNAL MEMORY USING REINFORCEMENT LEARNING

(71) Applicant: DeepMind Technologies Limited, London (GB)

(72) Inventors: Ilya Sutskever, San Francisco, CA (US); Ivo Danihelka, London (GB); Alexander Benjamin Graves, London (GB); Gregory Duncan Wayne, London (GB); Wojciech Zaremba, Kluczbork (PL)

(73) Assignee: DeepMind Technologies Limited, London (GB)

( * ) Notice: Subject to any disclaimer, the term of this patent is extended or adjusted under 35 U.S.C. 154(b) by 1161 days.

(21) Appl. No.: 15/396,331

(22) Filed: Dec. 30, 2016

(65) Prior Publication Data
US 2017/0323201 A1    Nov. 9, 2017

Related U.S. Application Data

(60) Provisional application No. 62/331,904, filed on May 4, 2016.

(51) Int. Cl.
*G06N 3/08* (2006.01)
*G06F 3/06* (2006.01)
(Continued)

(52) U.S. Cl.
CPC .............. *G06N 3/08* (2013.01); *G06F 3/0604* (2013.01); *G06F 3/0653* (2013.01);
(Continued)

(58) Field of Classification Search
CPC ........ G06N 3/08; G06N 3/0445; G06N 3/063; G06F 3/0604; G06F 3/0653; G06F 3/0673
See application file for complete search history.

(56) References Cited

U.S. PATENT DOCUMENTS

| 5,636,327 | A  | * | 6/1997 | Nakahira ........... G06K 9/00986 |
|           |    |   |        | 706/41 |
| 2015/0220833 | A1 |   | 8/2015 | Le et al. |
| 2019/0034416 | A1 | * | 1/2019 | Al Hasan ................ G06F 40/30 |

OTHER PUBLICATIONS

Das, Sreerupa, C. Lee Giles, and Guo-Zheng Sun. "Learning context-free grammars: Capabilities and limitations of a recurrent neural network with an external stack memory." Proceedings of The Fourteenth Annual Conference of Cognitive Science Society. Indiana University. 1992. (Year: 1992).*

(Continued)

*Primary Examiner* — Li B. Zhen
*Assistant Examiner* — Markus A. Vasquez
(74) *Attorney, Agent, or Firm* — Fish & Richardson P.C.

(57) ABSTRACT

Methods, systems, and apparatus, including computer programs encoded on computer storage media, for augmenting neural networks with an external memory using reinforcement learning. One of the methods includes providing an output derived from the system output portion of the neural network output as a system output in the sequence of system outputs; selecting a memory access process from a predetermined set of memory access processes for accessing the external memory from the reinforcement learning portion of the neural network output; writing and reading data from locations in the external memory in accordance with the selected memory access process using the differentiable portion of the neural network output; and combining the data read from the external memory with a next system input in the sequence of system inputs to generate a next neural network input in the sequence of neural network inputs.

20 Claims, 10 Drawing Sheets

(51) Int. Cl.
*G06N 3/04* (2006.01)
*G06N 3/063* (2006.01)

(52) U.S. Cl.
CPC ......... *G06F 3/0673* (2013.01); *G06N 3/0445* (2013.01); *G06N 3/063* (2013.01)

(56) References Cited

OTHER PUBLICATIONS

EP Communication pursuant to Article 94(3) EPC in European Appln. No. 16828902.3, dated Jan. 28, 2020, 8 pages.
Aberdeen et al. "Scaling internal-state policy-gradient methods for pomdps," Machine Learning International Workshop Then Conference, Jul. 2002, 8 pages.
Ba et al. "Multiple object recognition with visual attention," arXiv preprint arXiv1412.7755, Dec. 24, 2014, 10 pages.
Bengio et al. "Curriculum learning," Proceedings of the 26th annual international conference on machine learning, ACM, Jun. 14, 2009,.
Graves et al. "Hybrid computing using a neural network with dynamic external memory," Nature 538(7626) Oct. 12, 2016, 21 pages.
Graves et al. "Neural Turing Machines," arXiv preprint arXiv 1410.5401v2, Dec. 10, 2014, 26 pages.
Graves et al. "Neural Turing Machines," arXiv preprint arXiv1410.5401v1, Oct. 20, 2014, 26 pages.
Grenenstette et al. "Learning to transduce with unbounded memory," Advances in Neural Information Processing Systems, 2015, 9 pages.
International Search Report and Written Opinion in International Application No. PCT/US2016/069569, dated Mar. 29, 2017, 17 pages.
Joulin et al. "Inferring Algorithmic Patterns with Stack-Augmented Recurrent Nets," arXiv preprint arXiv 1503.01007v4, Jun. 1, 2015, 10 pages.
Kohl et al. "Policy gradient reinforcement learning for fast quadrupedal locomotion," Proceedings of the 2004 IEEE International Conference on Robotics and Automation, vol. 3, 2004, 6 pages.
Kurach et al. "Neural Random-Access Machines," arXiv preprint arXiv 1511.06392v3, Feb. 9, 2016, 17 pages.
Levine et al. "End-to-end training of deep visuomotor policies," Journal of Machine Learning Research 17(39), Jan. 1, 2016, 40 pages.
Mnih et al. "Playing Atari with deep reinforcement learning," arXiv preprint arXiv1312.5602, Dec. 19, 2013, 9 pages.
Mnih et al. "Recurrent models of visual attention," Advances in Neural Information Processing Systems, 2014, 9 pages.
Peters et al. "Policy gradient methods for robotics," 2006 IEEE/RSJ International Conference in Intelligent Robots and Systems, Oct. 2006, 7 pages.
Schmidhuber. "Optimal ordered problem solver," Machine Learning 54(3) 2004, 44 pages.
Schmidhuber. "Self-delimiting neural networks," arXiv preprint arXiv 1210.0118, Sep. 29, 2012, 15 pages.
Sukhbaatar et al. "Weakly supervised memory networks," arXiv preprint arXiv1503.08895, Apr. 12, 2015 9 pages.
Weston et al. "Memory Networks," arXiv preprint Arxiv1410.3916v11, Nov. 29, 2015, 15 pages.
Williams. "Simple statistical gradient-following algorithms for connectionist reinforcement learning," Machine Learning 8(3-4) May 1, 1992, 28 pages.
Zaremba et al. "Learning to execute," arXiv preprint arXiv1410.4615, Oct. 17, 2014, 25 pages.
Zaremba et al. "Reinforcement Learning Neural Turing Machines," arXiv preprint arXiv1505.00521v1, May 4, 2015, 13 pages.
Written Opinion issued in International Application No. PCT/US2016/069569, dated Apr. 9, 2018, 7 pages.

\* cited by examiner

AUGMENTING NEURAL NETWORKS WITH EXTERNAL MEMORY USING REINFORCEMENT LEARNING

CROSS-REFERENCE TO RELATED APPLICATION

This application claims priority to U.S. Provisional Application No. 62/331,904, filed on May 4, 2016. The disclosure of the prior application is considered part of and is incorporated by reference in the disclosure of this application.

BACKGROUND

This specification relates to neural network system architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from processing a previous input in computing a current output. An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes technologies that relate to augmented neural network systems.

In general, an augmented neural network system includes a neural network configured to receive a neural network input and generate a neural network output, an external memory that stores values derived from portions of the neural network output, and a memory interface subsystem that is configured to receive portions of the neural network output and erase, write, and read from the external memory using the received portions.

More specifically, the portions of the neural network output received by the memory interface subsystem include a reinforcement learning output portion and a differentiable output portion. The memory interface subsystem uses the reinforcement learning output portion to select a memory access process and then accesses the external memory using the differentiable output portion in accordance with the selected memory access process.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The subject matter described in this specification can be implemented in particular embodiments so as to realize one or more of the following advantages. The performance of the augmented neural network system can be improved by training the neural network to select the memory access process to be performed to access the external memory for each input in the sequence of system inputs. In particular, by using reinforcement learning to allow the neural network to generate an output that defines a hard decision, i.e., as opposed to a soft probabilistic selection, between memory access processes, the performance of the augmented neural network system can be improved. For example, the neural network can generate an output that defines a hard selection between partitions of the external memory to allow the augmented neural network system to make better use of the external memory. As another example, the neural network can generate an output that defines a hard selection between a content-based addressing and a location-based addressing to allow the augmented neural network system to more effectively interact with data stored in the memory.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
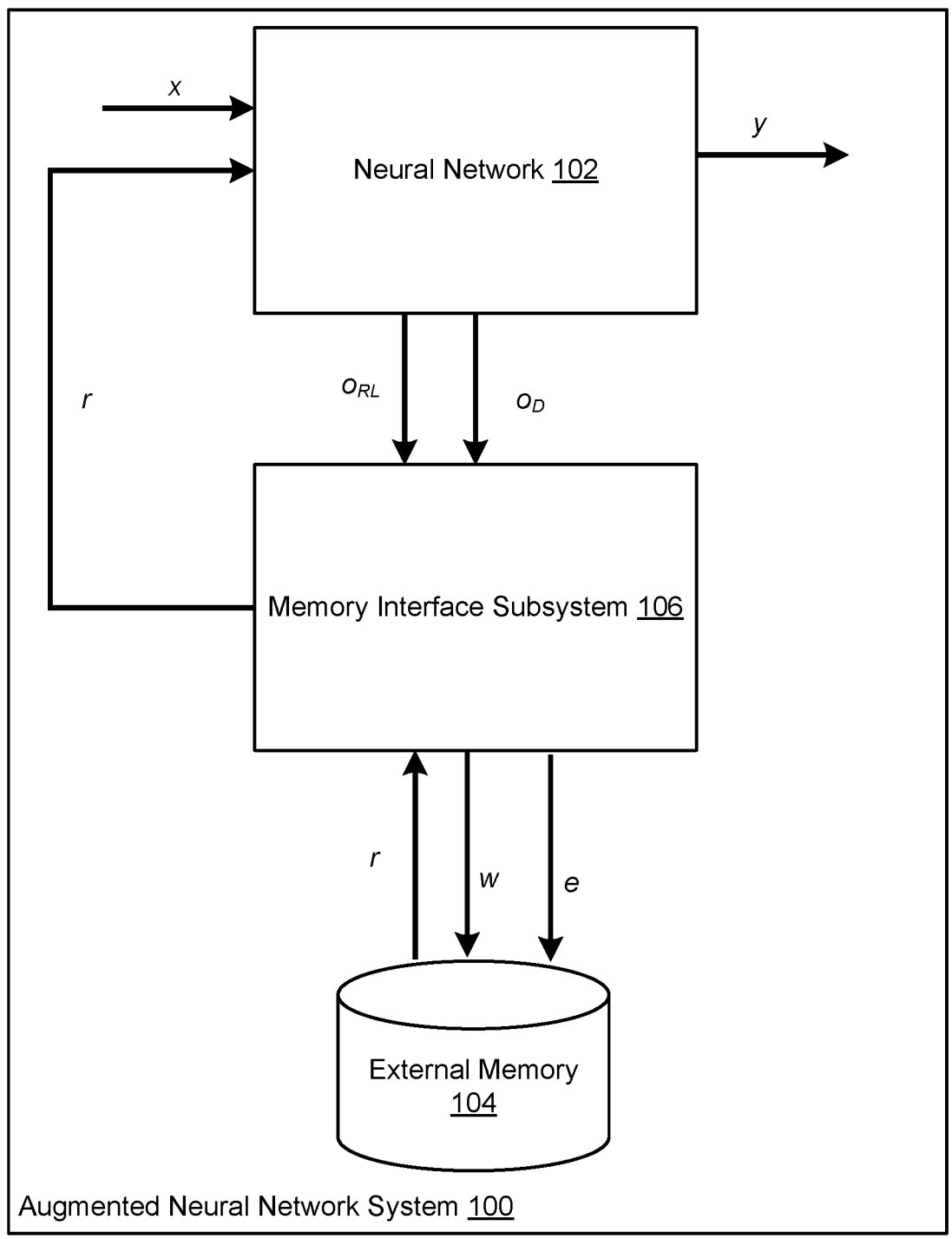
FIG. 1 shows an example augmented neural network system.

FIG. 1 shows an example augmented neural network system 100. The augmented neural network system 100 is an example of a system implemented as computer programs on one or more computers in one or more locations, in which the systems, components, and techniques described below are implemented.

The augmented neural network system 100 is a machine learning system that receives a sequence of system inputs and generates a sequence of system outputs from the system inputs. For example, the augmented neural network system 100 can receive a system input x as part of an input sequence and generate a system output y from the system input x. The augmented neural network system 100 can store the generated sequence of outputs in an output data repository or provide the output for use for some other immediate purpose.

The augmented neural network system 100 can be configured to receive any kind of digital data input and to generate any kind of score or classification output based on the input. For example, if the inputs to the augmented neural network system 100 are images or features that have been extracted from images, the output generated by the augmented neural network system 100 for a given image may be scores for each of a set of object categories, with each score representing an estimated likelihood that the image contains an image of an object belonging to the category. As another example, if the inputs to the augmented neural network system 100 are Internet resources (e.g., web pages), documents, or portions of documents or features extracted from Internet resources, documents, or portions of documents, the output generated by the augmented neural network system 100 for a given Internet resource, document, or portion of a document may be a score for each of a set of topics, with each score representing an estimated likelihood that the Internet resource, document, or document portion is about the topic. As another example, if the inputs to the augmented neural network system 100 are features of an impression context for a particular advertisement, the output generated by the augmented neural network system 100 may be a score that represents an estimated likelihood that the particular advertisement will be clicked on. As another example, if the inputs to the augmented neural network system 100 are features of a personalized recommendation for a user, e.g., features characterizing the context for the recommendation, e.g., features characterizing previous actions taken by the user, the output generated by the augmented neural network system 100 may be a score for each of a set of content items, with each score representing an estimated likelihood that the user will respond favorably to being recommended the content item. As another example, if the input to the augmented neural network system 100 is text in one language, the output generated by the augmented neural network system 100 may be a score for each of a set of pieces of text in another language, with each score representing an estimated likelihood that the piece of text in the other language is a proper translation of the input text into the other language. As another example, if the input to the augmented neural network system 100 is a spoken utterance, a sequence of spoken utterances, or features derived from one of the two, the output generated by the augmented neural network system 100 may be a score for each of a set of pieces of text, each score representing an estimated likelihood that the piece of text is the correct transcript for the utterance or sequence of utterances. As another example, the augmented neural network system 100 can be part of a speech synthesis system. As another example, the augmented neural network system 100 can be part of a video processing system. As another example, the augmented neural network system 100 can be part of a dialogue system. As another example, the augmented neural network system 100 can be part of an auto-completion system. As another example, the augmented neural network system 100 can be part of a text processing system. As another example, the augmented neural network system 100 can be part of a reinforcement learning system.

In particular, the augmented neural network system 100 includes a neural network 102 and an external memory 104.

The neural network 102 may be a feedfoward neural network or a recurrent neural network that is configured to receive a neural network input and process the neural network input to generate a neural network output.

Generally, each neural network input received by the neural network 102 is a combination of the current system input and data read from the external memory by a memory interface subsystem 106. For example, the neural network 102 may be configured to receive the current system input x and data r read from the external memory 104 and to generate a neural network output that includes the system output y and additional output o that is provided to the memory interface subsystem 106.

The memory interface subsystem 106 receives outputs generated by the neural network, e.g., a differentiable output portion $o_D$ and a reinforcement learning output portion $o_{RL}$ of the neural network output $o_D+o_{RL}+y$ (with the + signifying concatenation), and translates the received outputs into erase, read, and write operations to be performed on the external memory 104.

That is, the memory interface subsystem 106 receives an output $o_D+o_{RL}$ from the neural network 102 and, based on the output $o_D+o_{RL}$, erases data e from the external memory 104, writes data w to the external memory 104, and reads data r from the external memory 104. The data read by the memory interface subsystem 106 can then be provided to the neural network 102 as a portion of a later neural network input, e.g., along with a system input.

The external memory 104 stores data vectors written to the external memory 104 by the memory interface subsystem 106. In some implementations, the external memory 104 is a real-valued matrix memory that has elements M(i,j,t), where i indexes location, j indexes the vector element, and t indexes time. Thus, M(i,j,t) would be the value stored at element j of the vector stored at location i in the external memory 104 at time t.

In particular, the memory interface subsystem 106 uses the reinforcement learning output portion $o_{RL}$ to select a memory access process from a predetermined set of memory access processes and then uses the differentiable output portion $o_D$ to perform the erase, read, and write operations on the external memory 104 in accordance with the selected memory access process.

For example, in some implementations, the system uses the reinforcement learning output portion $o_{RL}$ to select a type of memory access to be performed, e.g., a content-based access or a location-based access, and then uses the differentiable output portion $o_D$ to perform that type of memory access to read from, write to, and erase from the external memory 104.

As another example, in some implementations, the external memory 104 is partitioned into multiple disjoint memory partitions. In these implementations, the system uses the reinforcement learning output portion $o_{RL}$ to select a partition from the multiple partitions and then uses the differentiable output portion $o_D$ to read from, write to, and erase from the selected partition of the external memory 104.

Because the use of the reinforcement learning output portion $o_{RL}$ to select the memory access process is generally not a differentiable operation, i.e., because the memory access process selection is a "hard" selection rather than a continuous weighting, the augmented neural network system 100 trains the neural network 102 to generate the reinforcement learning output portion $o_{RL}$ and the remaining portions of the output using a reinforcement learning technique. An example reinforcement learning technique that can be used to train the neural network 102 is the REINFORCE algorithm described in Williams, Ronald J. Simple statistical gradient-following algorithms for connectionist reinforcement learning. Machine learning, 8(3-4):229-256, 1992.

Figure 2:
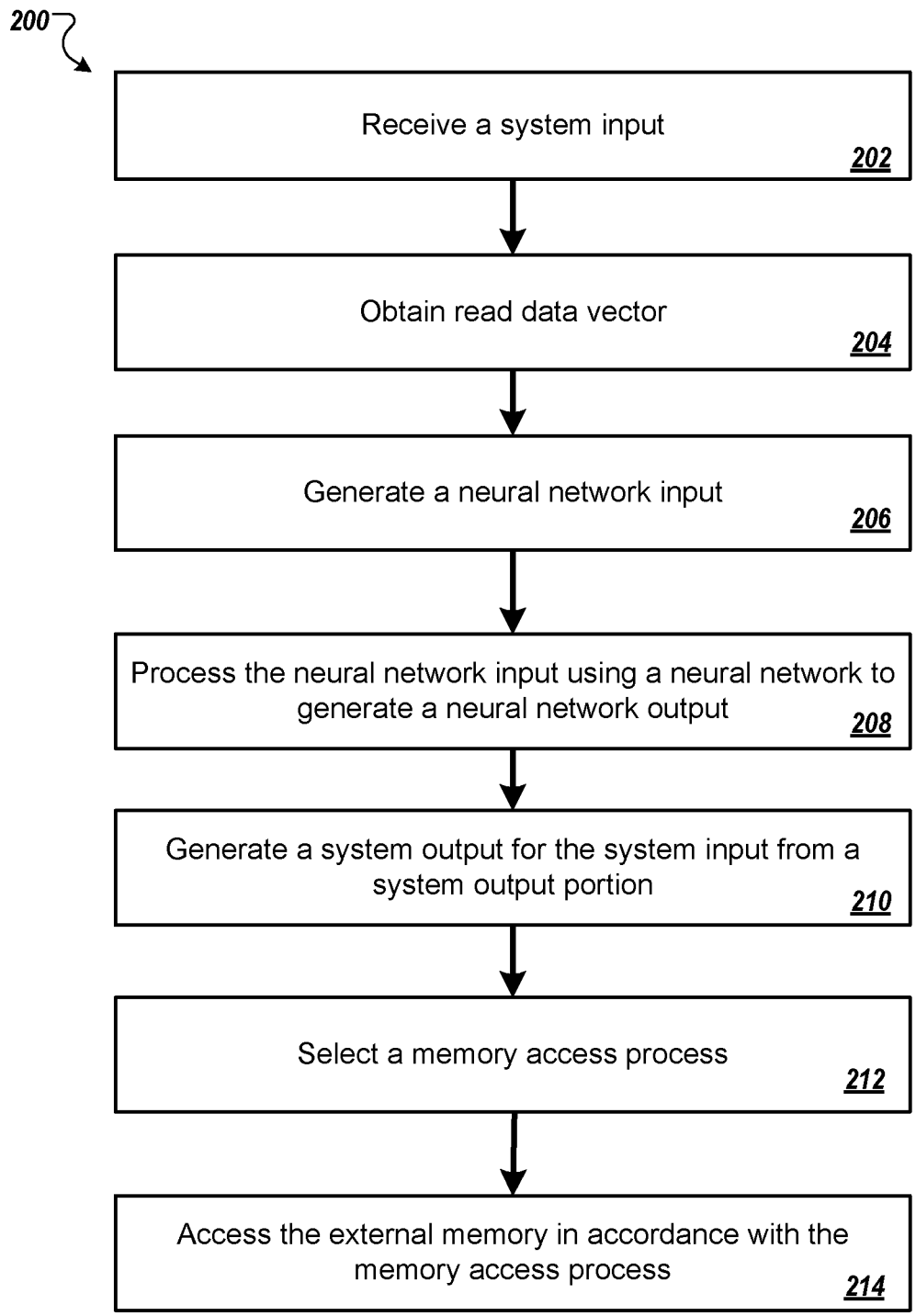
FIG. 2 is a flow diagram of an example process for generating a system output from a system input.

FIG. 2 is a flow diagram of an example process 200 for generating a system output from a system input. For convenience, the process 200 will be described as being performed by a system of one or more computers located in one or more locations. For example, an augmented neural network system, e.g., the augmented neural network system 100 of FIG. 1, appropriately programmed in accordance with this specification, can perform the process 200.

The system receives a system input (step 202). The system input is one of a sequence of system inputs received by the system.

The system obtains a read data vector generated by reading from an external memory (step 204), e.g., the external memory 104 of FIG. 1. Generally, the read data vector was generated by the system by reading from the external memory during processing of the preceding input in the sequence of system inputs.

In some implementations, the read data vector also includes data identifying the memory access process that was used to access the external memory during the processing of the preceding input in the sequence. That is, in some implementations, the system generates data identifying the memory access process that was used, e.g., a one-hot encoding, and appends the data to the read data to generate the read data vector.

The system generates a neural network input by combining the system input and the data read from the external memory (step 206). For example, the system can concatenate the system input and the read data vector to generate the neural network input. For the first system input, the system can concatenate the system input with a pre-determined vector, e.g., a learned state of the neural network.

The system processes the neural network input using a neural network, e.g., the neural network 102 of FIG. 1, to generate a neural network output from the neural network input (step 208). Depending on the implementation, the neural network can either be a feed-forward neural network, e.g., a convolutional neural network or another kind of deep feed-forward neural network, or a recurrent neural network, e.g., an LSTM neural network.

If the neural network is a recurrent neural network, the recurrent neural network also uses the internal state of the recurrent neural network from the preceding neural network input in the sequence in processing the current neural network input to generate the neural network output.

In some implementations, the neural network includes both recurrent and feed-forward layers.

The system generates a system output for the system input from a system output portion of the neural network output (step 210). The system output portion of the neural network output is a predetermined portion of the neural network output that has been designated, e.g., by a system administrator, as the portion to be used to generate the system output, i.e., so that the same portion of the neural network output is used to generate the system output for each output generated by the neural network.

In some implementations, the system provides the system output portion as the system output for the system input. In some other implementations, however, the system applies one or more transformations to the system output portion in order to generate the system output. For example, the system output portion may be transformed into a command to control a robot or a different digital interface.

The system selects a memory access process using a reinforcement learning output portion of the neural network output (step 212). The reinforcement learning output portion of the neural network output is a predetermined portion of the neural network output that has been designated, e.g., by a system administrator, as the portion to be used to select a memory access process, i.e., so that the same portion of the neural network output is used to select the memory access process for each output generated by the neural network.

In particular, the reinforcement learning output portion includes one or more memory access process scores.

In some implementations, the selection of the memory access process is a selection between a content-based access or a location-based access.

In some of these implementations, the memory access process scores include only a single score. In these implementations, the system may select an access type based on whether the score exceeds a threshold or the score may define a probability with which the system selects one of the access types.

In others of these implementations, the memory access scores include a respective score for each access type. In these implementations, the system may select the access type having the highest memory access score or may sample from the score distribution defined by the access scores to select the access type.

In other implementations, the selection of the memory access process is a selection between disjoint partitions of the external memory. In these implementations, the memory access process scores include a respective score for each partition and the system selects the partition having the highest memory access score or samples from the score distribution defined by the access scores to select the partition.

The system performs a write operation, a read operation, and an erase operation on the external memory using a differentiable output portion of the neural network output (step 214).

The differentiable output portion of the neural network output is a predetermined portion of the neural network output that has been designated as the portion to be used in performing the write, read, and erase operations on the external memory and includes an erase portion, a write portion, and a read portion.

In particular, in order to erase from the external memory, the system determines erasing weights using the erase portion of the differentiable output portion, determines writing weights using the write portion of the differentiable output portion, and determines reading weights using the read portion of the differentiable output portion.

In some implementations, the writing weights are the same as the erasing weights, i.e., the designated subportion of the write portion is the erase portion of the neural network output. In some other implementations, however, the designated subportion of the write portion is different from the erase portion.

The system then erases from the external memory in accordance with the erasing weights, writes to the external memory in accordance with the writing weights, and reads from the external memory in accordance with the reading weights.

The system performs the write, read and erase operations in accordance with the memory access process selected using the reinforcement learning output portion.

That is, when the memory access process selection is a selection between a content-based access or a location-based access, the reading, writing, and erasing weights are each either content-based weights or location-based weights. Reading, writing, and erasing using a content-based access is described below with reference to FIGS. 3 and 8-10. Reading, writing, and erasing using a location-based access is described below with reference to FIGS. 4 and 8-10.

When the memory access process selection is a selection between partitions of the external memory, the system reads, writes, and erases from the selected partition of the external memory. In these implementations, rather than performing only a content-based or location-based memory access, the system accesses the memory by determining content-based weights and then applying a location-based adjustment to the content-based weights to determine a respective final weight for each location in the selected partition. Reading, writing, and erasing from a selected partition is described in more detail in FIGS. 5-10.

In some implementations, the system performs multiple erase, read, and write operations for a given system input. For example, the system can perform multiple sets that each include an erase operation, a read operation, and a write operation in parallel and independently of each other set of the operations. Additionally, the system can use different memory access weights in performing each set of operations, e.g., because the system uses a different portion of the neural network output in computing each of the sets of memory access weights.

Additionally, the system can perform the erase, read, and write operations in any order. For example, in some implementations, the system erases, then writes, and then reads from the external memory. However, in other implementations, the system can perform these operations in a different order.

Figure 3:
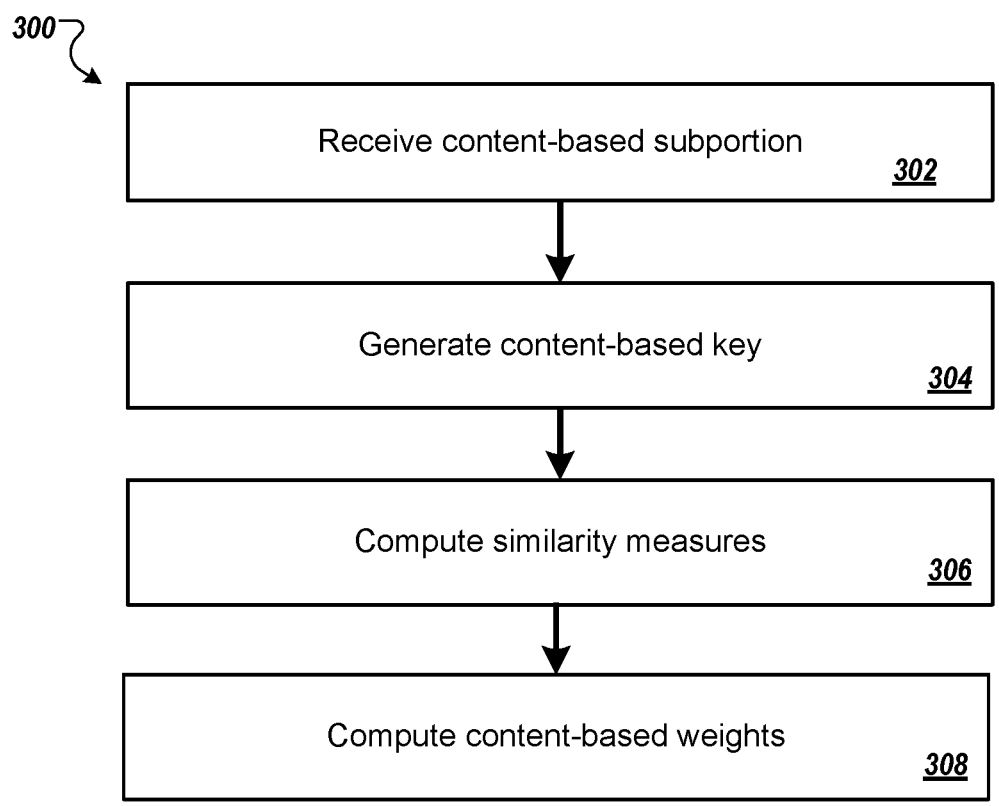
FIG. 3 is a flow diagram of an example process for generating content-based weights for locations in an external memory.

FIG. 3 is a flow diagram of an example process 300 for generating content-based weights for locations in an external memory. For convenience, the process 300 will be described as being performed by a system of one or more computers located in one or more locations. For example, an augmented neural network system, e.g., the augmented neural network system 100 of FIG. 1, appropriately programmed in accordance with this specification, can perform the process 300.

The system receives a content-based subportion of a designated portion, i.e., of the read, write, or erase portion, of the neural network output (step 302).

The system generates a content-based key vector from the content-based subportion (step 304). In some implementations, the system may use the content-based subportion as the content-based key vector. In some other implementations, the system applies one or more transformations to the content-based subportion in order to generate the content-based key vector. For example, the system may process the content-based subportion using a neural network, e.g., a multilayer perceptron (MLP) neural network, that is configured to receive the subportion and generate the content-based key vector.

The system computes similarity measures between the content-based key vector and the vectors stored in the external memory (step 306). That is, the system computes a respective similarity measure between the content-based key vector and each vector stored in the external memory. For example, the similarity measure may be a cosine similarity measure, with the similarity K between the content-based key vector k(h,t) and a given vector M(i,•,t) located at the i-th location in the external memory M satisfying:

$$K(k(h,t), M(i,\cdot,t)) = \frac{k(h,t)\cdot M(i,\cdot,t)}{\|k(h,t)\|\|M(i,\cdot,t)\|}.$$

The system computes the content-based weights for the locations in the external memory using the similarity measures (step 308). Generally, the system computes the weights so that locations that have higher similarity measures with the content-based key vector are assigned higher weights. For example, the content-based weight for the i-th location in the external memory M may satisfy:

$$w_c(i,h,t) = \frac{\exp(\beta(h,t)K(k(h,t), M(i,\cdot,t)))}{\sum_{i'} \exp(\beta(h,t)K(k(h,t), M(i',\cdot,t)))},$$

where β(h,t) is a "key strength" value that is a positive value derived from a designated portion of the neural network output and the sum is a sum over all of the locations in the external memory.

Figure 4:
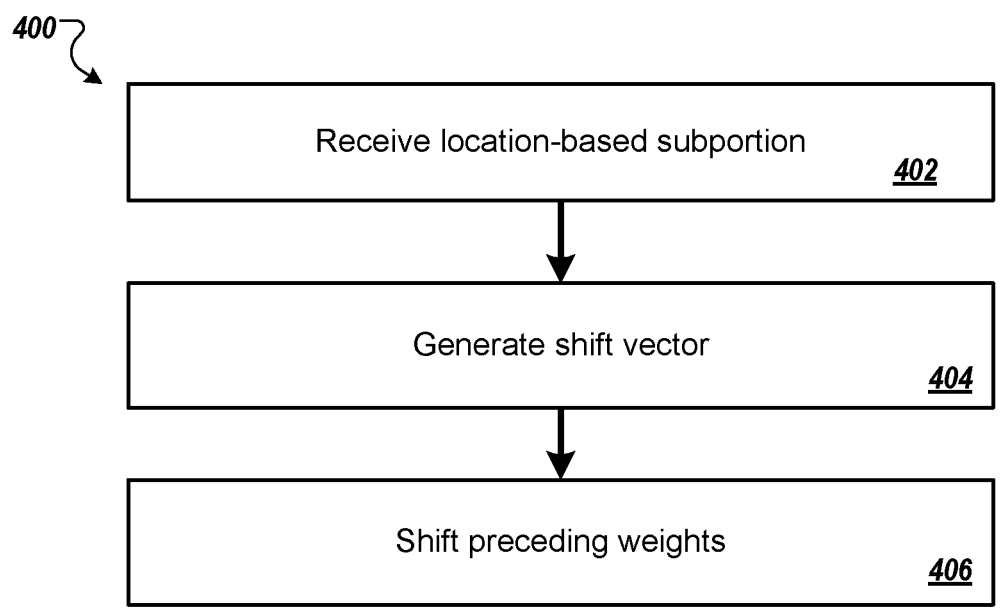
FIG. 4 is a flow diagram of an example process for generating location-based weights for locations in an external memory.

FIG. 4 is a flow diagram of an example process 400 for generating location-based weights for locations in an external memory. For convenience, the process 400 will be described as being performed by a system of one or more computers located in one or more locations. For example, an augmented neural network system, e.g., the augmented neural network system 100 of FIG. 1, appropriately programmed in accordance with this specification, can perform the process 400.

The system receives a location-based subportion of a designated portion of the neural network output (step 402). In some implementations, the location-based subportion is the same subportion as the content-based subportion. In some other implementations, however, the location-based subportion can be a different subportion of the designated portion than the content-based subportion.

The system generates a shift vector from the location-based subportion (step 404). In some implementations, the system may use the location-based subportion as the shift vector. In some other implementations, the system applies one or more transformations to the location-based subportion in order to generate the shift vector. For example, the system may process the location-based subportion using a neural network, e.g., an MLP neural network, that is configured to receive the subportion and generate the shift vector.

The system shifts the preceding weights using the shift vector to generate the location-based weights (step 406). Generally, the previous weights generated by the system are the location-based weights generated by the system during processing of the preceding system input. If the current system input is the first system input in the sequence, the system can use a predetermined initial set of weights as the preceding weights.

In particular, the system applies a convolution, e.g., a circular convolution, to the preceding weights using the shift vector to generate the memory access weights. For example, the weight w(i,h,t+1) for the location i in the external memory may satisfy:

$$w(i, h, t+1) = \sum_{j=0}^{N-1} w(j, h, t)s(i-j, h, t+1),$$

where all index arithmetic is computed modulo N, where w(j,h,t) are the preceding weights, and where s(i−j, h, t+1) is the shift vector for location i-j in the memory.

Figure 5:
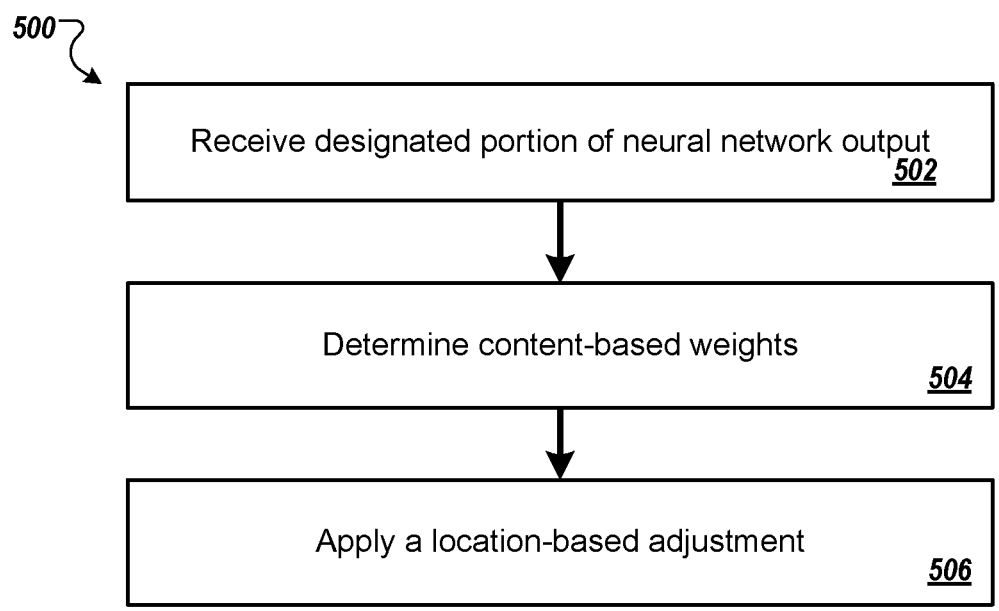
FIG. 5 is a flow diagram of an example process for determining memory access weights from a designated portion of a neural network output.

FIG. 5 is a flow diagram of an example process 500 for determining memory access weights from a designated portion of a neural network output. For convenience, the process 500 will be described as being performed by a system of one or more computers located in one or more locations. For example, an augmented neural network system, e.g., the augmented neural network system 100 of FIG. 1, appropriately programmed in accordance with this specification, can perform the process 500.

The system receives a designated portion of a neural network output (step 502).

The system determines content-based weights from a content-based subportion of the designated portion (step 504). The content-based weights include a respective weight for each location in the selected partition of the external memory. Determining the content-based weights is described in more detail below with reference to FIG. 6.

The system applies a location-based adjustment to the content-based weights to determine the memory access weights for the locations in the selected partition of the external memory (step 506). Generally, the system determines a shift vector from a location-based subportion of the designated portion and then uses the shift vector to adjust the content-based weights in order to determine the memory access weights, i.e., as described below with reference to FIG. 7.

Figure 6:
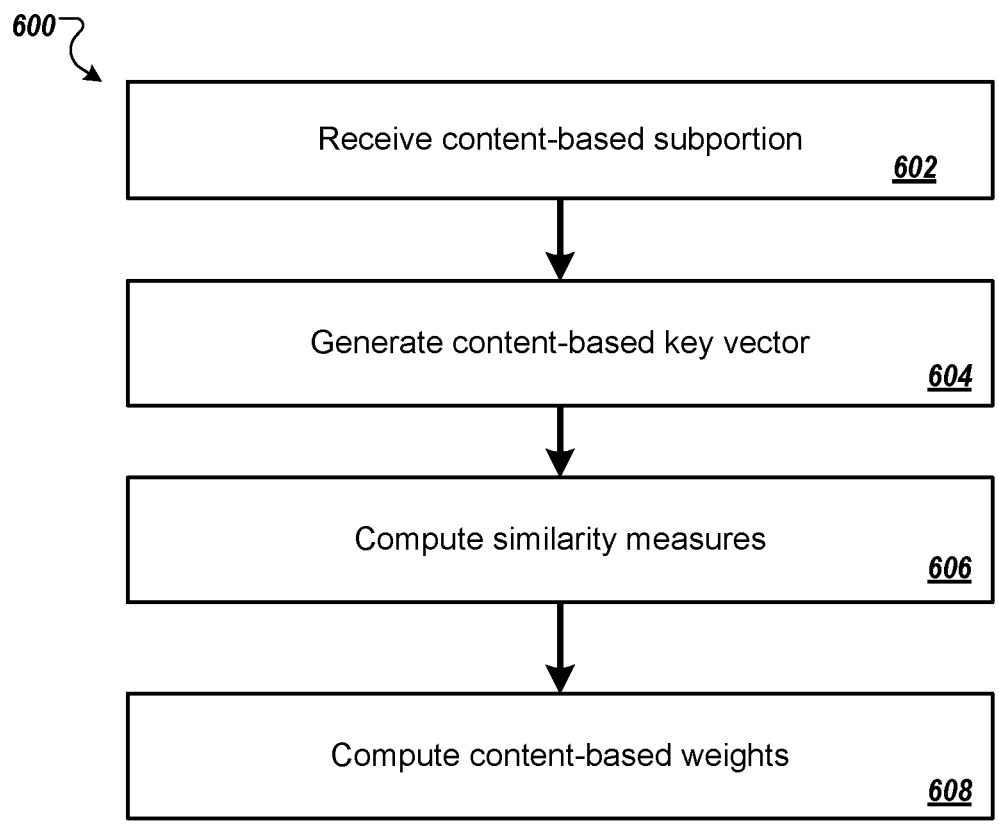
FIG. 6 is a flow diagram of an example process for generating content-based weights for locations in a selected partition of an external memory.

FIG. 6 is a flow diagram of an example process 600 for generating content-based weights for locations in a selected partition of an external memory. For convenience, the process 600 will be described as being performed by a system of one or more computers located in one or more locations. For example, an augmented neural network system, e.g., the augmented neural network system 100 of FIG. 1, appropriately programmed in accordance with this specification, can perform the process 600.

The system receives a content-based subportion of a designated portion of the neural network output (step 602).

The system generates a content-based key vector from the content-based subportion (step 604). In some implementations, the system may use the content-based subportion as the content-based key vector. In some other implementations, the system applies one or more transformations to the content-based subportion in order to generate the content-based key vector. For example, the system may process the content-based subportion using a neural network, e.g., a multilayer perceptron (MLP) neural network, that is configured to receive the subportion and generate the content-based key vector.

The system computes similarity measures between the content-based key vector and the vectors stored in the locations in the selected partition of the external memory (step 606). That is, the system computes a respective similarity measure between the content-based key vector and each vector stored in the selected partition of the external memory. For example, the similarity measure may be a cosine similarity measure, with the similarity K between the content-based key vector k(h,t) and a given vector M(i,•,t) located at the i-th location in the external memory M satisfying:

$$K(k(h, t), M(i, \cdot, t)) = \frac{k(h, t) \cdot M(i, \cdot, t)}{\|k(h, t)\|\|M(i, \cdot, t)\|}.$$

The system computes the content-based weights for the locations in the selected partition of the external memory using the similarity measures (step 606). Generally, the system computes the weights so that locations that have higher similarity measures with the content-based key vector are assigned higher weights. For example, the content-based weight for the i-th location in the external memory M may satisfy:

$$w_c(i, h, t) = \frac{\exp(\beta(h, t)K(k(h, t), M(i, \cdot, t)))}{\sum_{i'} \exp(\beta(h, t)K(k(h, t), M(i', \cdot, t)))},$$

where β(h,t) is a "key strength" value that is a positive value derived from a designated portion of the neural network output and the sum is a sum over all of the locations in the selected partition of the external memory.

Figure 7:
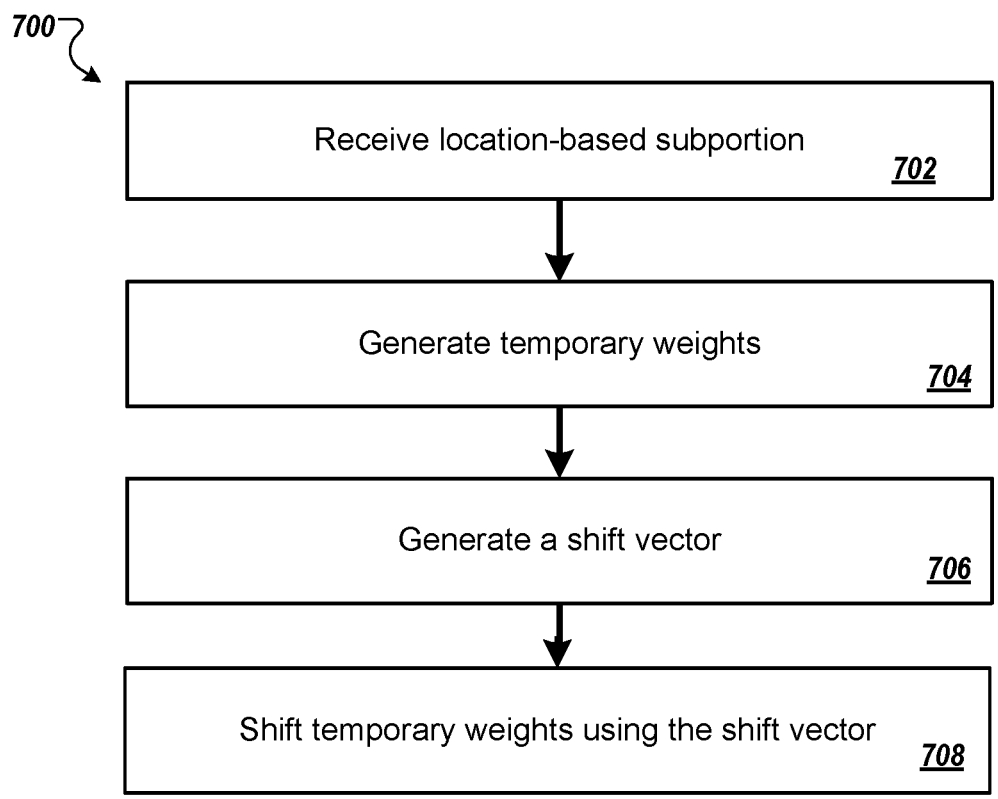
FIG. 7 is a flow diagram of an example process for applying a location-based adjustment to content-based weights for locations in a selected partition of the external memory.

FIG. 7 is a flow diagram of an example process 700 for applying a location-based adjustment to content-based weights for locations in a selected partition of the external memory. For convenience, the process 700 will be described as being performed by a system of one or more computers located in one or more locations. For example, an augmented neural network system, e.g., the augmented neural network system 100 of FIG. 1, appropriately programmed in accordance with this specification, can perform the process 700.

The system receives a location-based subportion of a designated portion of the neural network output (step 702).

The system generates temporary weights from the content-based weights and the preceding weights generated by the system (step 704). Generally, the previous weights generated by the system are the memory access weights generated by the system during processing of the preceding system input for which the current selected partition was the selected partition. The system generates the temporary weights by combining the content-based weights and the preceding weights. For example, the temporary weights may be an interpolation of the content-based weights and the preceding weights, with the temporary weights $\tilde{w}(i,h,t+1)$ for a given location i in the external memory for a t+1-th system input satisfying:

$$\tilde{w}(i,h,t+1)=(1-g_i(h,t+1))w_c(i,h,t+1)+g_i(h,t+1)w(i,h,t),$$

where $g_i$(h,t+1) is a gate output that is between zero and one is and is derived from a designated portion of the neural network output, $w_c$(i, h, t+1) are the content-based weights for the t+1-th system input, and w(i,h,t) are the memory access weights from the t-th system input.

The system generates a shift vector from the location-based subportion (step 706). In some implementations, the system may use the location-based subportion as the shift vector. In some other implementations, the system applies one or more transformations to the location-based subportion in order to generate the shift vector. For example, the system may process the location-based subportion using a neural network, e.g., an MLP neural network, that is configured to receive the subportion and generate the shift vector.

The system shifts the temporary weights using the shift vector to generate the memory access weights for the locations in the selected partition in the external memory (step 708). In particular, the system applies a convolution, e.g., a circular convolution, to the temporary weights using the shift vector to generate the memory access weights. For example, the weight w(i,h,t+1) for the location i in the external memory may satisfy:

$$w(i, h, t+1) = \sum_{j=0}^{N-1} \tilde{w}(j, h, t+1)s(i-j, h, t+1),$$

where all index arithmetic is computed modulo N, and where s(i−j,h,t+1) is the shift vector for location i−j in the memory.

Figure 8:
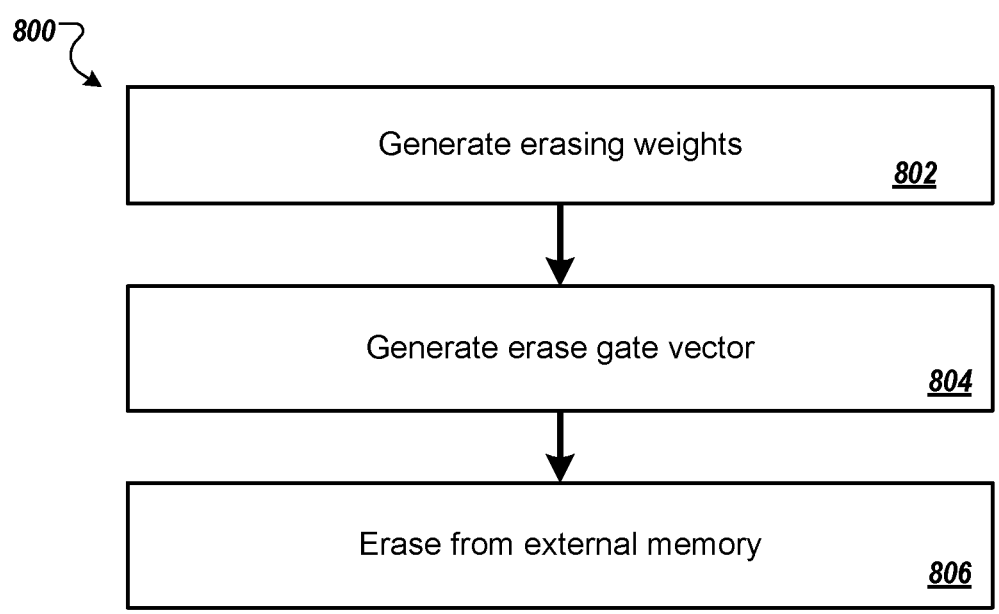
FIG. 8 is a flow diagram of an example process for erasing from an external memory in accordance with erasing weights.

FIG. 8 is a flow diagram of an example process 800 for erasing from an external memory in accordance with erasing weights. For convenience, the process 800 will be described as being performed by a system of one or more computers located in one or more locations. For example, an augmented neural network system, e.g., the augmented neural network system 100 of FIG. 1, appropriately programmed in accordance with this specification, can perform the process 800.

The system generates erasing weights (step 802). If the memory access process selection was a selection between a content-based access and a location-based access, the system generates a respective erasing weight for each location in the external memory using either the process 300 or the process 400. If the memory access process selection was a selection of a partition of the external memory, the system generates a respective erasing weight for each location in the selected partition using the processes 500-700.

The system generates an erase vector (step 804). In some implementations, the system may use a designated portion of the neural network output as the erase vector. In some other implementations, the system applies one or more transformations to the portion in order to generate the erase vector. For example, the system may process the portion using a neural network, e.g., a multilayer perceptron (MLP) neural network, that is configured to receive the portion and generate the erase vector.

The system erases from the external memory using the erasing weights and the erase gate vector (step 806). In particular, for a value M(i,j,t) stored at vector element j of a vector stored at location i in the external memory, the system generates an erased value $\tilde{M}$(i, j, t+1) that satisfies:

$$\tilde{M}(i, j, t+1) = M(i, j, t)\prod_{h=1}^{H}(1 - w_e(i, h, t+1)g_e(j, h, t+1)),$$

where $w_e$ (i, h, t+1) is the erasing weight for the location i and $g_e$(j,h,t+1) is the erase vector. If the memory access process selection was a selection of a partition of the external memory, the system erases only from locations in the selected partition.

In implementations where the system performs multiple erase operations for a given system input, e.g., in parallel as described above, each erase operation can be performed independently by performing the technique 800 with optionally different values for the erasing weights and the erase gate vectors. For example, each erase operation can be performed by using a different neural network with possibly different parameter values to generate the erase gate vector. Thus, the cumulative effect of the multiple erase operations being performed in parallel is multiplicative.

Figure 9:
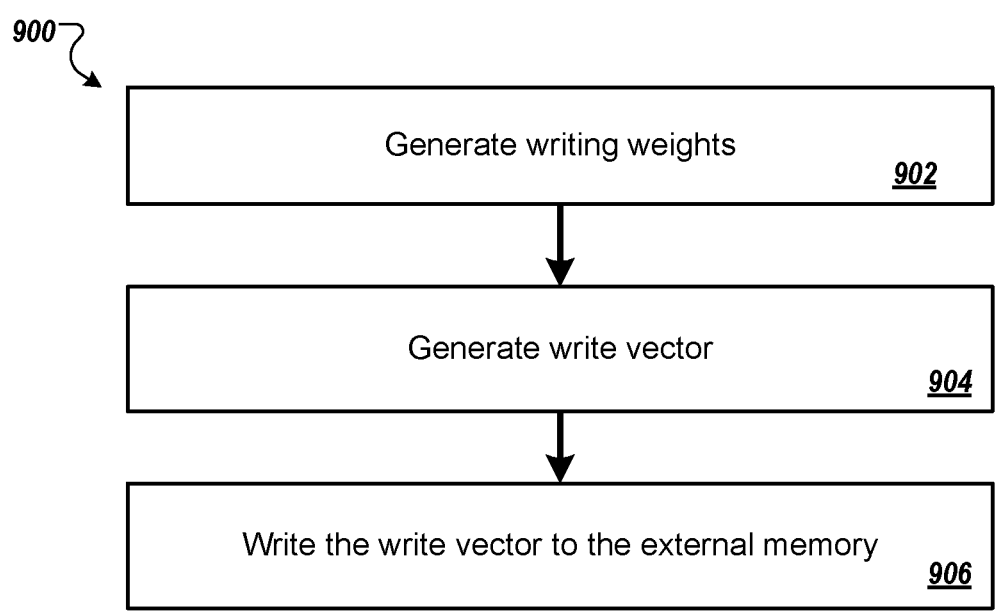
FIG. 9 is a flow diagram of an example process for writing to an external memory in accordance with erasing weights.

FIG. 9 is a flow diagram of an example process 900 for writing to an external memory in accordance with writing weights. For convenience, the process 900 will be described as being performed by a system of one or more computers located in one or more locations. For example, an augmented neural network system, e.g., the augmented neural network system 100 of FIG. 1, appropriately programmed in accordance with this specification, can perform the process 900.

The system generates writing weights (step 902). If the memory access process selection was a selection between a content-based access and a location-based access, the system generates a respective writing weight for each location in the external memory using either the process 300 or the process 400. If the memory access process selection was a selection of a partition of the external memory, the system generates a respective writing weight for each location in the selected partition using the processes 500-700.

As described above, in some implementations, the writing weights are the same as the erasing weights.

The system generates a write vector from a different designated portion of the writing output portion (step 904). In some implementations, the system may use the different designated subportion as the write vector. In some other implementations, the system applies one or more transformations to the different designated subportion in order to generate the write vector. For example, the system may process the different designated subportion using a neural network, e.g., an MLP neural network, that is configured to receive the subportion and generate the write vector.

The system writes the write vector to the external memory using the writing weights (step 906). In particular, for a value M(i,j,t) stored at vector element j of a vector stored at location i in the external memory, the system generates a value M(i, j, t+1) that satisfies:

$$M(i, j, t+1) = M(i, j, t) + \sum_{h=1}^{H} w_w(i, h, t+1)v(j, h, t+1)),$$

where $w_w$ (i, h, t+1) is the writing weight for the location i and v(j, h, t+1) is the value at element h of the write vector. In implementations where the write operation is performed after the erase operation, rather than modifying a value M(i,j,t), the system can generate the value M(i, j, t+1) by modifying the value $\tilde{M}$(i, j, t+1) generated by the erasing operation described above.

If the memory access process selection was a selection of a partition of the external memory, the system writes to only the locations in the selected partition.

In implementations where the system performs multiple write operations for a given system input, e.g., in parallel as described above, each write operation can be performed independently by performing the technique 900 with optionally different values for the writing weights and the write vectors. For example, each write operation can be performed by using a different neural network with possibly different parameter values to generate the write vector. Thus, the cumulative effect of the multiple write operations being performed in parallel is additive.

Figure 10:
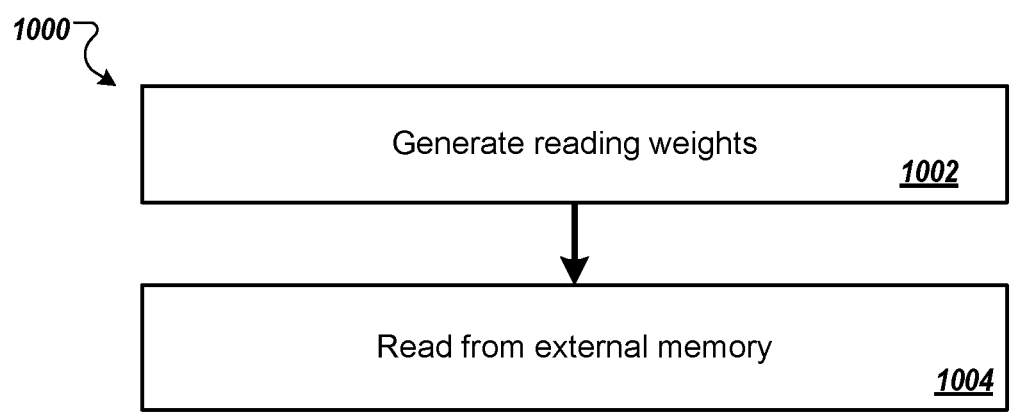
FIG. 10 is a flow diagram of an example process for reading from an external memory in accordance with erasing weights.

FIG. 10 is a flow diagram of an example process 1000 for reading from an external memory in accordance with reading weights. For convenience, the process 1000 will be described as being performed by a system of one or more computers located in one or more locations. For example, an augmented neural network system, e.g., the augmented neural network system 100 of FIG. 1, appropriately programmed in accordance with this specification, can perform the process 1000.

The system generates reading weights (step 1002). If the memory access process selection was a selection between a content-based access and a location-based access, the system generates a respective reading weight for each location in the external memory using either the process 300 or the process 400. If the memory access process selection was a selection of a partition of the external memory, the system generates a respective reading weight for each location in the selected partition using the processes 500-700.

The system reads from locations in the external memory in accordance with the reading weights (step 1004). In particular, the system generates a read data vector by combining the value stored at each location in the external memory. That is, for a given element of the read data vector, the system computes a weighted average of each value stored in the external memory at that element, with the weight for each value being the reading weight for the corresponding location. For example, the value of the read vector at element j r(j,h,t+1) may satisfy:

$$r(j, h, t+1) = \sum_{i=0}^{N-1} w_r(i, h, t+1) M(i, j, t+1)),$$

where $w_r$ (i, h, t+1) is the reading weight for the location i and M(i, j, t+1) is the value at element j of the vector stored at location i in the memory.

If the memory access process selection was a selection of a partition of the external memory, the system reads only from locations in the selected partition of the external memory.

In implementations where the system performs multiple read operations for a given system input, e.g., in parallel as described above, each read operation can be performed independently by performing the technique 1000 with optionally different values for the reading weights. In these implementations, the system can combine the read data vectors generated by each read operation, e.g., by concatenating the vectors, to form a final read data vector that is provided as part of the neural network input to the neural network.

Depending on the implementation, the system can maintain various degrees of persistence of the data stored in the external memory based on outputs received from the neural network. For example, in some implementations, the system re-sets the external memory after each sequence of system inputs has been fully processed by the system. As another example, in some implementations, the data stored in the external memory persists between input sequences. That is, the system does not delete any data from the external memory between sequences of system inputs. In these implementations, the system may re-set the external memory after a given task assigned to the system is completed and before the system begins a different machine learning task. Alternatively, the system may maintain the external memory without deleting values even between tasks. Thus, while processing a current input sequence, the system may be able to leverage data stored in the memory while processing a previous input sequence or even while performing a previous machine learning task.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An augmented neural network system for processing a sequence of system inputs to generate a sequence of system outputs, the augmented neural network system comprising one or more computers and one or more storage devices storing instructions that when executed by the one or more computers cause the one or more computers to implement:
    a neural network, wherein the neural network is configured to receive a sequence of neural network inputs and to process each neural network input to generate a neural network output from the neural network input, the neural network output comprising a concatenation of:
        a system output portion that is used to generate a system output in the sequence of system outputs that corresponds to the neural network input,
        a reinforcement learning portion that is used to make a hard selection of one of a plurality of memory access processes for accessing an external memory that is external to the neural network, wherein making the hard selection comprises making a hard selection of a partition to be accessed from a plurality of partitions of the external memory, wherein the selected partition comprises a plurality of memory locations in the external memory, and a differentiable portion that defines a content of a write to the plurality of locations in the selected partition of the external memory, wherein the reinforcement learning portion, the differentiable portion, and the system output portion are different portions of the neural network output;

a memory interface subsystem, wherein the memory interface subsystem is configured to perform operations comprising, for each of the neural network outputs:
providing an output derived from the system output portion of the neural network output as the system output in the sequence of system outputs;
selecting the memory access process from the predetermined set of memory access processes for accessing the external memory from the reinforcement learning portion of the neural network output, wherein the selection of the memory access process is a non-differentiable operation comprising:
the hard selection of the one of the partitions of the external memory based on the reinforcement learning portion of the neural network output, and wherein the neural network has been trained to generate neural network outputs that are used to select memory access processes through reinforcement learning;
writing and reading data only from the locations in the selected partition of the external memory using the differentiable portion of the neural network output; and
combining the data read from the external memory with a next system input in the sequence of system inputs to generate a next neural network input in the sequence of neural network inputs.

2. The augmented neural network system of claim 1, the operations further comprising, for each of the neural network outputs:
erasing data from locations in the external memory in accordance with the selected memory access process using the differentiable portion of the neural network output.

3. The augmented neural network system of claim 1, wherein writing and reading data only from the locations in the selected partition of the external memory using the differentiable portion of the neural network output comprises:
determining a respective writing weight for each of the locations in the selected partition of the external memory from the differentiable portion of the neural network output;
writing data defined by the differentiable portion of the neural network output to each of a plurality of locations in the selected partition of the external memory in accordance with the writing weights;
determining a respective reading weight for each of the locations in the selected partition of the external memory from the differentiable portion of the neural network output; and
reading data from each of the plurality of locations in the selected partition in the external memory in accordance with the reading weights.

4. The augmented neural network system of claim 1, wherein selecting a memory access process further comprises selecting either a content-based access or a location-based access.

5. The augmented neural network system of claim 4, wherein, when the selected memory access process is a content-based access, writing and reading data from the locations in the selected partition of the external memory comprises:
determining a respective content-based writing weight for each of the plurality of locations in the selected partition of the external memory from the differentiable portion of the neural network output;
writing data defined by the differentiable portion of the neural network output to each of the plurality of locations in accordance with the content-based writing weights;
determining a respective content-based reading weight for each of the plurality of locations from the differentiable portion of the neural network output; and
reading data from each of the plurality of locations in accordance with the content-based reading weights.

6. The augmented neural network system of claim 4, wherein, when the selected memory access process is a location-based access, writing and reading data from the locations in the selected partition of the external memory comprises:
determining a respective location-based writing weight for each of the plurality of locations in selected partition of the external memory from the differentiable portion of the neural network output;
writing data defined by the differentiable portion of the neural network output to each of the plurality of locations in accordance with the location-based writing weights;
determining a respective location-based reading weight for each of the plurality of locations in the external memory from the differentiable portion of the neural network output; and
reading data from each of the plurality of locations in accordance with the location-based reading weights.

7. The augmented neural network system of claim 1, wherein combining the data read from the external memory with a next system input in the sequence of system inputs to generate a next neural network input in the sequence of neural network inputs comprises:
including data identifying the selected memory access process in the next neural network input.

8. A method of processing a sequence of system inputs to generate a sequence of system outputs performed by one or more computers, the method comprising:
providing a neural network input to a neural network, wherein the neural network is configured to receive the neural network input and to process the neural network input to generate a neural network output from the neural network input, the neural network output comprising:
a system output portion that is used to generate a system output in the sequence of system outputs that corresponds to the neural network input,
a reinforcement learning portion that is used to make a hard selection of one of a plurality of memory access processes for accessing an external memory that is external to the neural network, wherein making the hard selection comprises making a hard selection of a partition to be accessed from a plurality of partitions of the external memory, wherein the selected partition comprises a plurality of memory locations in the external memory, and
a differentiable portion that defines a content of a write to the plurality of locations in the selected partition of the external memory, wherein the reinforcement learning portion, the differentiable portion, and the system output portion are different portions of the neural network output;

providing an output derived from the system output portion of the neural network output as the system output in the sequence of system outputs;

selecting the memory access process from the predetermined set of memory access processes for accessing the external memory from the reinforcement learning portion of the neural network output, wherein the selection of the memory access process is a non-differentiable operation comprising:

the hard selection of the one of the partitions of the external memory based on the reinforcement learning portion of the neural network output, and wherein the neural network has been trained to generate neural network outputs that are used to select memory access processes through reinforcement learning;

writing and reading data only from the locations in the selected partition of the external memory using the differentiable portion of the neural network output; and combining the data read from the external memory with a next system input in the sequence of system inputs to generate a next neural network input in the sequence of neural network inputs.

9. The method of claim 8, further comprising:
erasing data from locations in the external memory in accordance with the selected memory access process using the differentiable portion of the neural network output.

10. The method of claim 8, wherein writing and reading data only from locations in the selected partition of the external memory using the differentiable portion of the neural network output comprises:

determining a respective writing weight for each of the plurality of locations in the selected partition of the external memory from the differentiable portion of the neural network output;

writing data defined by the differentiable portion of the neural network output to each of the plurality of locations in the selected partition of the external memory in accordance with the writing weights;

determining a respective reading weight for each of the plurality of locations in the selected partition of the external memory from the differentiable portion of the neural network output; and reading data from each of the plurality of locations in the selected partition in the external memory in accordance with the reading weights.

11. The method of claim 8, wherein selecting a memory access process further comprises selecting either a content-based access or a location-based access.

12. The method of claim 11, wherein, when the selected memory access process is a content-based access, writing and reading data from the plurality of locations in the selected partition of the external memory comprises:

determining a respective content-based writing weight for each of the plurality of locations in the selected partition of the external memory from the differentiable portion of the neural network output;

writing data defined by the differentiable portion of the neural network output to each of the plurality of locations in accordance with the content-based writing weights;

determining a respective content-based reading weight for each of the plurality of locations in the selected partition of the external memory from the differentiable portion of the neural network output; and reading data from each of the plurality of locations in accordance with the content-based reading weights.

13. The method of claim 11, wherein, when the selected memory access process is a location-based access, writing and reading data from the locations in the selected partition of the external memory comprises:

determining a respective location-based writing weight for each of the plurality of locations in the selected partition of the external memory from the differentiable portion of the neural network output;

writing data defined by the differentiable portion of the neural network output to each of the plurality of locations in accordance with the location-based writing weights;

determining a respective location-based reading weight for each of the plurality of locations in the external memory from the differentiable portion of the neural network output; and reading data from each of the plurality of locations in accordance with the location-based reading weights.

14. The method of claim 13, wherein combining the data read from the external memory with a next system input in the sequence of system inputs to generate a next neural network input in the sequence of neural network inputs comprises:

including data identifying the selected memory access process in the next neural network input.

15. One or more non-transitory computer-readable storage media storing instructions that when executed by one or more computers cause the one or more computers to perform operations for processing a sequence of system inputs to generate a sequence of system outputs, the operations comprising:

providing a neural network input to a neural network, wherein the neural network is configured to receive the neural network input and to process the neural network input to generate a neural network output from the neural network input, the neural network output comprising:

a system output portion that is used to generate a system output in the sequence of system outputs that corresponds to the neural network input, a reinforcement learning portion that is used to make a hard selection of one of a plurality of memory access processes for accessing an external memory that is external to the neural network, wherein making the hard selection comprises making a hard selection of a partition to be accessed from a plurality of partitions of the external memory, wherein the selected partition comprises a plurality of memory locations in the external memory, and a differentiable portion that defines a content of a write to the plurality of locations in the selected partition of the external memory, wherein the reinforcement learning portion, from the differentiable portion, and the system output portion are different portions of the neural network output;

providing an output derived from the system output portion of the neural network output as the system output in the sequence of system outputs;

selecting the memory access process from the predetermined set of memory access processes for accessing the external memory from the reinforcement learning portion of the neural network output, wherein the selection of the memory access process is a non-differentiable operation comprising:

the hard selection of the one of the partitions of the external memory based on the reinforcement learning portion of the neural network output, and wherein the neural network has been trained to generate neural network outputs that are used to select memory access processes through reinforcement learning;

writing and reading data only from the locations in the selected partition of the external memory using the differentiable portion of the neural network output; and combining the data read from the external memory with a next system input in the sequence of system inputs to generate a next neural network input in the sequence of neural network inputs.

16. The non-transitory computer-readable storage media of claim 15, the operations further comprising:

erasing data from locations in the external memory in accordance with the selected memory access process using the differentiable portion of the neural network output.

17. The non-transitory computer-readable storage media of claim 16, wherein writing and reading data only from locations in the selected partition of the external memory using the differentiable portion of the neural network output comprises:

determining a respective writing weight for each of the plurality of locations in the selected partition of the external memory from the differentiable portion of the neural network output;

writing data defined by the differentiable portion of the neural network output to each of the plurality of locations in the selected partition of the external memory in accordance with the writing weights;

determining a respective reading weight for each of the plurality of locations in the selected partition of the external memory from the differentiable portion of the neural network output; and reading data from each of the plurality of locations in the selected partition in the external memory in accordance with the reading weights.

18. The non-transitory computer-readable storage media of claim 15, wherein selecting a memory access process further comprises selecting either a content-based access or a location-based access.

19. The non-transitory computer-readable storage media of claim 18, wherein, when the selected memory access process is a content-based access, writing and reading data from the plurality of locations in the selected partition of the external memory comprises:

determining a respective content-based writing weight for each of the plurality of locations in the selected partition of the external memory from the differentiable portion of the neural network output;

writing data defined by the differentiable portion of the neural network output to each of the plurality of locations in accordance with the content-based writing weights;

determining a respective content-based reading weight for each of the plurality of locations in the selected partition of the external memory from the differentiable portion of the neural network output; and reading data from each of the plurality of locations in accordance with the content-based reading weights.

20. The non-transitory computer-readable storage media of claim 18, wherein, when the selected memory access process is a location-based access, writing and reading data from the locations in the selected partition of the external memory comprises:

determining a respective location-based writing weight for each of the plurality of locations in the selected partition of the external memory from the differentiable portion of the neural network output;

writing data defined by the differentiable portion of the neural network output to each of the plurality of locations in accordance with the location-based writing weights;

determining a respective location-based reading weight for each of the plurality of locations in the external memory from the differentiable portion of the neural network output; and reading data from each of the plurality of locations in accordance with the location-based reading weights.

* * * * *